United States Patent

Freeman

[11] 4,055,263
[45] Oct. 25, 1977

[54] FREIGHT HANDLING METHOD

[75] Inventor: James W. Freeman, San Pablo, Calif.

[73] Assignee: Naylor, Neal & Uilkema, San Francisco, Calif. ; a part interest

[21] Appl. No.: 690,978

[22] Filed: May 28, 1976

[51] Int. Cl.² ............................................. B65G 63/00
[52] U.S. Cl. .................................. 214/152; 214/14
[58] Field of Search ............... 214/12, 13, 14, 15 R, 214/152, 38 C, 38 CC; 114/258, 259, 260

[56] References Cited

U.S. PATENT DOCUMENTS

| 649,784 | 5/1900 | Weeks | 214/14 X |
| 1,522,707 | 1/1925 | Andrews et al. | 214/152 |
| 2,096,958 | 10/1937 | Clerc | 214/38 D X |
| 2,672,840 | 3/1954 | Sharp et al. | 214/14 X |
| 3,119,506 | 1/1964 | Bridge et al. | 214/38 CC X |
| 3,550,796 | 12/1970 | Walda | 214/14 X |

Primary Examiner—Frank E. Werner
Attorney, Agent, or Firm—Naylor, Neal & Uilkema

[57] ABSTRACT

Freight is shipped from a production center to a railhead by loading the freight at the production center onto railroad boxcars which are water-borne, i.e. carried by railroad barges or railroad ferries. The track-carrying vessel which carries the boxcars is provided with a loading platform onto which forklift trucks carrying palletized freight can drive from a dockside warehouse facility and from which the forklift trucks can move via removable runways into boxcars arranged in multiple rows.

4 Claims, 4 Drawing Figures

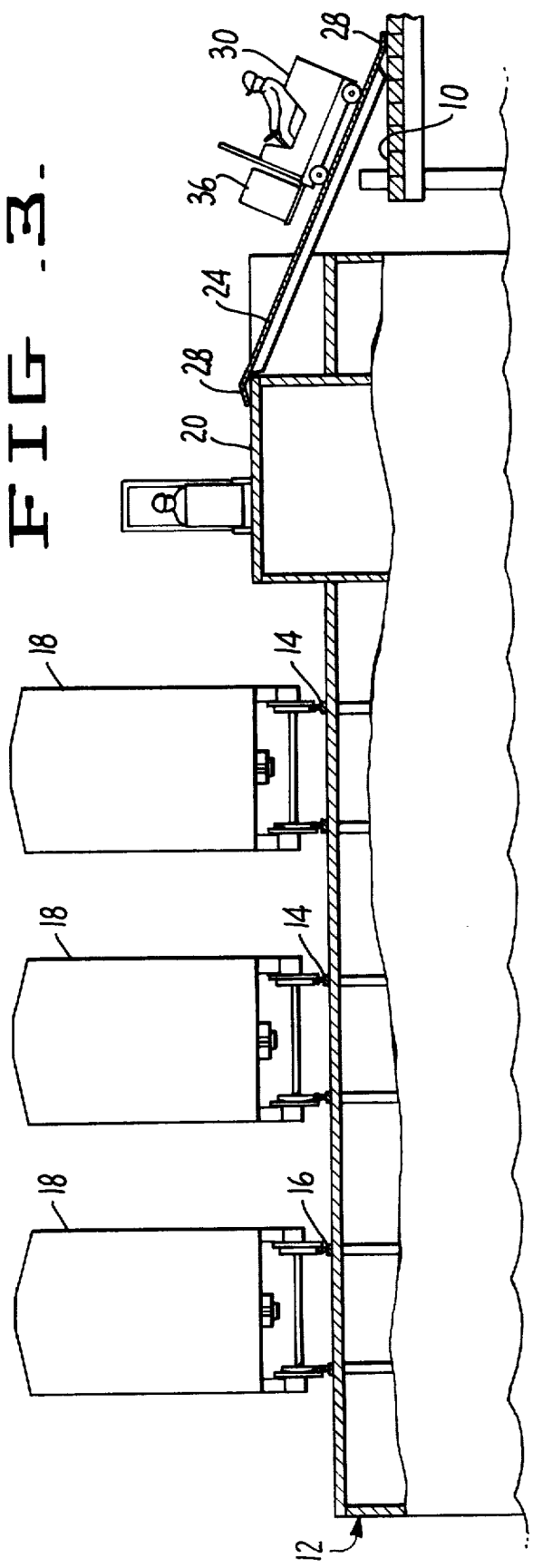
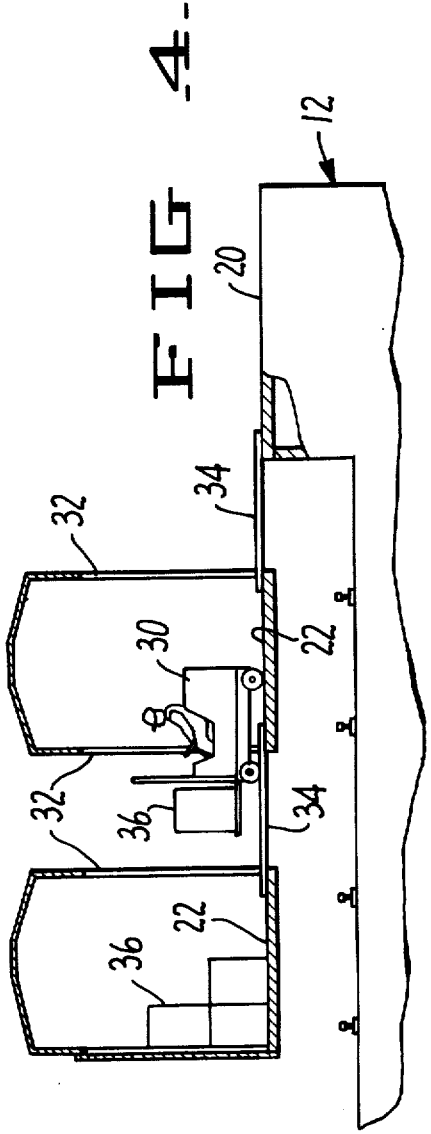

FREIGHT HANDLING METHOD

SUMMARY OF THE INVENTION

An object of the invention is to provide a new method and means for handling palletized or palletizable freight between a production or warehouse facility and a railhead remotely located with respect to the production or warehouse facility while minimizing pallet-handling.

Another object of the invention is to provide a new freight-handling method and means, the adoption of which would enable the building of a plant or warehouse facility along a waterway at a distance from railroad facilities.

The freight handling method of the invention is, for example, especially adapted for the handling of sugar in the San Francisco Bay area between the sugar refinery at Crockett and the ship to shore railheads at Richmond and Oakland. At the present time this sugar is handled and shipped in the following manner. It is packaged and palletized at the refinery and the loaded pallets are stacked and stored in the dockside warehouse at the refinery. Thereafter forklift trucks pick up the loaded pallets in the warehouse and re-stack them aboard a ship which carries them to a dock adjacent the railhead at Richmond. Forklifts move onto the ship and remove the palletized sugar to a dockside warehouse. At some later time the forklifts remove the sugar from the warehouse and place it in railroad boxcars for shipment to other parts of the country. All of this involves four forklift handlings of the sugar as compared to two such handlings under the present method, i.e. one from the refinery into the refinery warehouse and another from the warehouse into the shipborne boxcars.

Other objects and advantages of the invention will be apparent from the following description taken in conjunction with the drawings forming part of this specification, and in which:

FIG. 3 is an enlarged view taken along lines 3—3 of FIG. 2; and

FIG. 4 is an enlarged view taken along lines 4—4 of FIG. 2.

Figure 1:
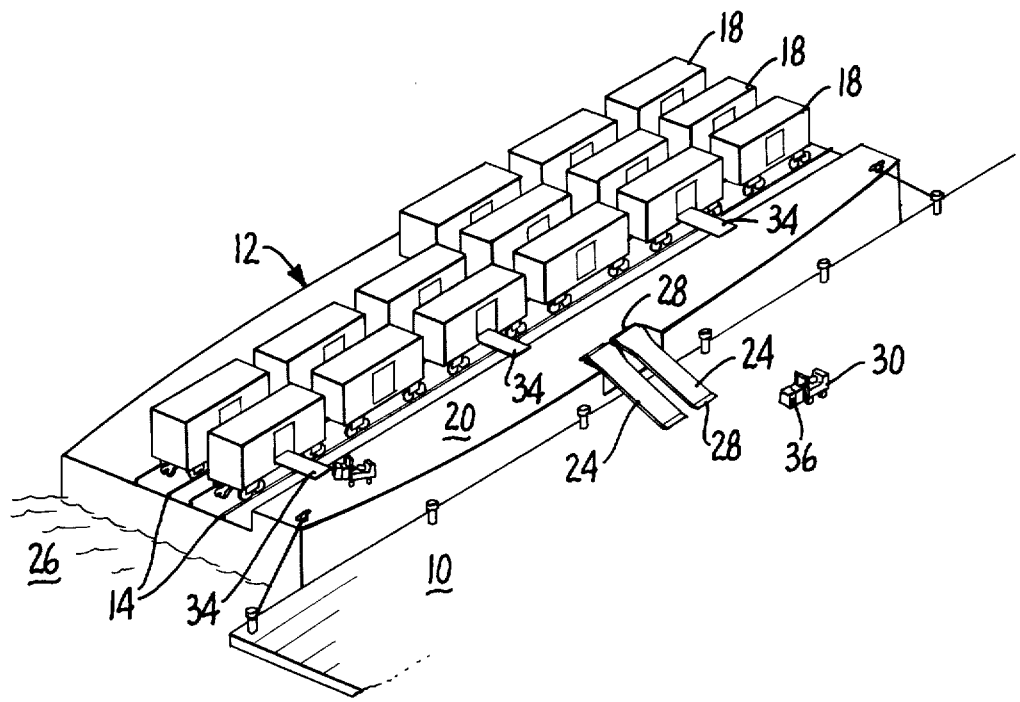
FIG. 1 is a view in perspective of a rail barge or rail ferry tied up for the loading of its boxcars in accordance with the subject freight handling method.
Figure 2:
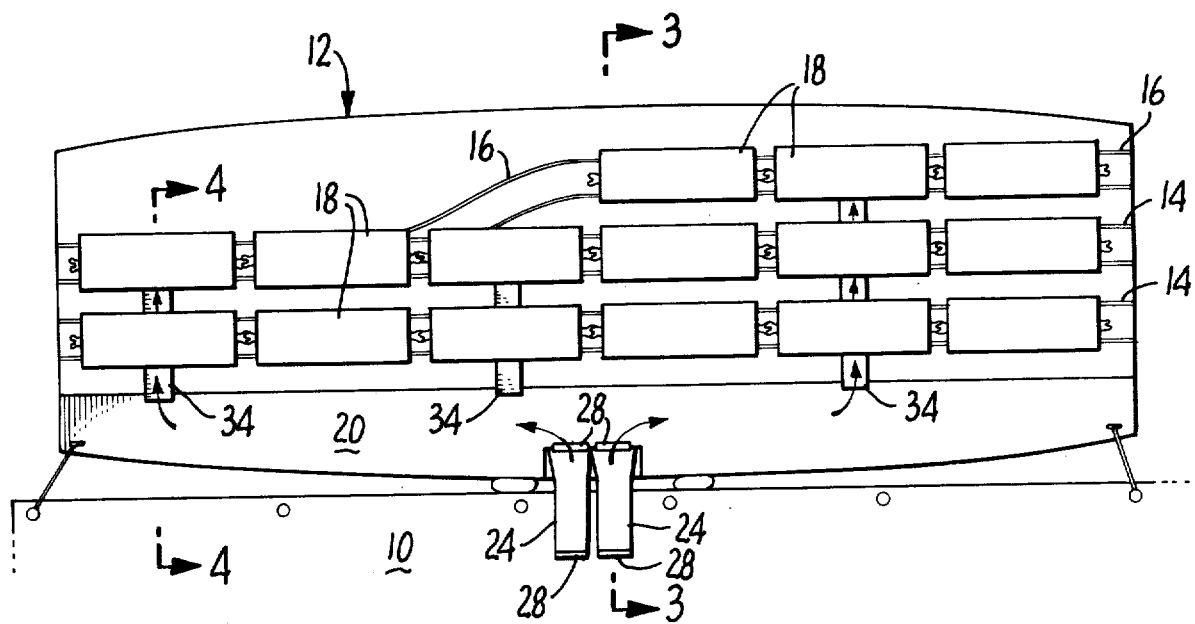
FIG. 2 is a plan view of the boxcar-laden vessel of FIG. 1.

With reference to the drawings, 10 is a dock or pier adjacent which there would be a storage warehouse, not shown, as a part of a production facility, as, for example, a sugar refinery. Tied up to the dock is a railroad car carrier vessel or barge 12. The vessel 12 is provided with a plurality of tracks 14 running the full length of the vessel and a shorter side track 16 to which cars can be switched from the adjacent track 14. Boxcars 18 are carried on the rails.

The vessel is provided along at least one side thereof with its own raised, dock-like runway or loading platform 20, the top of which is substantially level with the floors 22 (FIG. 4) of the boxcars. The vessel is provided with a well whereby loading ramps 24 are enabled to interconnect the dock 10 and the ship's loading platform 20 while keeping the included angle between the ramps 24 and the dock 10 relatively small. The ramps 24 are provided at both upper and lower ends with pivot plates 28 enabling smooth entrances onto the ramps and departures therefrom of the forklift trucks 30 regardless of the differential in height between the dock 10 and the vessel loading platform 20 due to varying load and tidal conditions.

The boxcars 18 are conventional, being provided at both sides with central loading doors 32. Portable runways 23 enable the loading trucks 30 to move into the cars for car loading and unloading of freight units 36. The freight units 36 are shown somewhat schematically in the drawings. These units would usually consist of palletized freight, e.g. palletized sugar in bagged or boxed condition. It will be appreciated that the forklift trucks 30 can be of the pallet unloading type, that is, of the type which can invert the palletized load, stack the load and take away the pallet.

After the cars 18 have been loaded, their doors are closed and secured. The portable runways 34 are stowed on board. The vehicles 30 either leave the vessel or are secured to the loading deck. The ramps 24 are raised and stowed on board the vessel. The vessel is then ready for transport either under tow or under its own power to a water-land railhead where the cars 18 are removed and are thereafter connected into a train for shipment to the destination for unloading.

The subject freight handling method and means enables train units to be loaded at plant or warehouse locations lacking rail facilities or where the railroad line on which the cars 18 are destined for shipment lacks freight handling rights on existing rail connections at the plant or warehouse.

The subject method and means therefore enables freight to be brought to existing railroads rather than requiring the building of new railroad facilities to service new plant locations. The building of plant facilities is therefore divorced from the existence of at the site railroad facilities.

Prior to the subject freight handling inventions, the building of plants away from rail facilities required that the products produced be hauled by trucks to rail facilities. The subject handling method eliminates the use of trucks and consequently reduces atmospheric pollution due to exhaust emissons of trucks. Of course, under the subject freight handling system the building of new plant or warehouse facilities would be limited to locations on navigable bodies of water.

It will be appreciated that the subject freight handling inventions can be used to bring raw materials to the plant facility as well as to transport products therefrom, and, also, that the vessel may be provided with any suitable means, such as a ballast tank system, to maintain the trim of the vessel under all conditions.

What is claimed is:

1. A freight handling method comprising loading freight cars onto a railroad car carrier vessel at a railhead transfer facility, moving said vessel to a dock having a freight storage facility associated therewith, loading said cars with freight from said freight storage facility, moving said vessel with its loaded freight cars to a railhead transfer facility, and moving said cars off of said vessel over said transfer facility for subsequent train makeup and destination shipping.

2. The method of claim 1, including disposing said cars on said vessel in side by side rows, connecting said vessel with said dock with a ramp to enable freight-loading vehicles to travel from said dock onto said vessel and back onto said dock independent of any change in tidal condition, and connecting said cars with runways to each other and to a loading deck of said vessel to enable said vehicles to travel onto said cars and from row to row thereof.

3. The method of claim 2, including positioning said loading deck along one side of said vessel for substantially the length of the row of cars adjacent to said loading deck and at a height substantially corresponding to the level of the floors of said cars.

4. A freight handling method comprising positioning freight cars on a railroad car carrier vessel, positioning said vessel at a predetermined position, loading said cars with freight while maintaining said vessel at said predetermined position, moving said vessel with its loaded cars to a railhead transfer facility, and moving said cars off of said vessel over said facility for subsequent train makeup and destination shipping.

* * * * *